(12) United States Patent
Kelly et al.

(10) Patent No.: US 10,655,289 B1
(45) Date of Patent: May 19, 2020

(54) PET WASTE COLLECTION DEVICE WITH ARTICULATED RECTANGULAR FRAME

(71) Applicants: Kevin B. Kelly, Hillsborough, NJ (US); Elisabeth A. Kelly, Hillsborough, NJ (US)

(72) Inventors: Kevin B. Kelly, Hillsborough, NJ (US); Elisabeth A. Kelly, Hillsborough, NJ (US)

( * ) Notice: Subject to any disclaimer, the term of this patent is extended or adjusted under 35 U.S.C. 154(b) by 0 days.

(21) Appl. No.: 16/396,472

(22) Filed: Apr. 26, 2019

(51) Int. Cl.
*E01H 1/12* (2006.01)
*E01H 1/00* (2006.01)
*A01K 1/01* (2006.01)

(52) U.S. Cl.
CPC ........... *E01H 1/1206* (2013.01); *E01H 1/006* (2013.01); *A01K 1/011* (2013.01); *A01K 1/0125* (2013.01); *E01H 2001/128* (2013.01)

(58) Field of Classification Search
CPC .................. E01H 1/1206; E01H 1/006; E01H 2001/1233; E01H 2001/1266; E01H 2001/1273; E01H 2001/128; E01H 2001/1293; A01K 23/005; A01K 1/011; A01K 1/0125
USPC ........................................................ 294/1.4
See application file for complete search history.

(56) References Cited

U.S. PATENT DOCUMENTS

| | | |
|---|---|---|
| 2,141,007 A | 12/1938 | Meeh |
| 3,052,214 A | 9/1962 | Johnson |
| 3,139,299 A | 6/1964 | Bowen |
| 3,281,178 A | 10/1966 | Fisher |
| 3,286,826 A | 11/1966 | Stoll |
| 3,431,008 A | 3/1969 | Narita |
| 3,446,525 A | 5/1969 | Jones |
| 3,560,039 A | 2/1971 | Gruber |
| 3,606,436 A | 9/1971 | Lynch |
| 3,659,891 A | 5/1972 | Pettenon |
| 3,676,887 A | 7/1972 | Klein |
| 3,716,263 A | 2/1973 | Gatti |
| 3,757,737 A | 9/1973 | Drum |
| 3,778,097 A | 12/1973 | Dorzan |
| 3,786,780 A | 1/1974 | Pezzino |
| 3,804,448 A | 4/1974 | Schmieler |
| 3,819,220 A | 6/1974 | Bredt |
| 4,019,768 A | 4/1977 | Niece |
| 4,215,887 A | 8/1980 | Boots |
| 4,243,259 A | 1/1981 | Wright |
| 4,323,272 A | 4/1982 | Fortier |
| 4,341,410 A | 7/1982 | Summach |

(Continued)

*Primary Examiner* — Stephen A Vu (57) ABSTRACT

A pet waste collection system has a main housing with a recessed wall area adapted for nesting of a collapsible frame, and at least one orifice on said back wall for movement of a portion of a sliding pole. At the far end of the sliding pole is a collapsible frame for a holding a waste receptacle, which is formed of at least two unconnected frame sections, wherein these unconnected frame sections have a first, collapsed position and a second, extended, open position. One frame section of said at least two unconnected frame sections is a leading linear frame section for positioning closest to the rear of a pet to create a wide linear edge area for efficient pet waste collection. Another embodiment pet waste collection system has a fixed handle, a main housing and a separate telescopic pole which moves the connected frame to and from the main housing.

19 Claims, 7 Drawing Sheets

(56) References Cited

U.S. PATENT DOCUMENTS

| | | | | |
|---|---|---|---|---|
| 4,741,566 | A | * | 5/1988 | Byung-Do ............ A01K 23/005 15/104.8 |
| 4,900,077 | A | | 2/1990 | Beck |
| 5,203,598 | A | | 4/1993 | Lindlbauer |
| 5,269,575 | A | | 12/1993 | Parvaresh |
| 5,290,080 | A | | 3/1994 | Yoshioka |
| 5,318,330 | A | | 6/1994 | Dombrowski |
| 5,344,200 | A | | 9/1994 | Yoshioka |
| 5,634,678 | A | | 6/1997 | Bailey |
| 5,702,138 | A | * | 12/1997 | Elkind ................. E01H 1/1206 15/257.4 |
| 6,039,370 | A | | 3/2000 | Dooley, Jr. |
| 6,554,335 | B1 | | 4/2003 | Kelly |
| 7,232,165 | B2 | | 6/2007 | Zelon |
| 7,448,659 | B1 | | 11/2008 | Auseklis |
| 7,631,910 | B2 | * | 12/2009 | Shalhoub ............. A01K 23/005 294/1.5 |
| 7,841,303 | B2 | | 11/2010 | Perez Tomas |
| 7,845,695 | B2 | | 12/2010 | Eyton |
| 7,854,455 | B2 | | 12/2010 | Ruscil |
| 8,292,339 | B1 | * | 10/2012 | Auseklis ............... E01H 1/1206 294/1.4 |
| 8,550,511 | B2 | * | 10/2013 | Baars ....................... E01H 1/12 294/1.3 |
| 9,382,679 | B2 | | 7/2016 | Bevans |
| 9,422,683 | B2 | | 8/2016 | O'Hare |
| 9,609,489 | B2 | * | 3/2017 | Bertz ................. H04L 61/3015 |
| 2006/0181091 | A1 | | 8/2006 | Zelon |
| 2009/0152884 | A1 | | 6/2009 | Ruscil |
| 2013/0062895 | A1 | | 3/2013 | Groth |

* cited by examiner

PET WASTE COLLECTION DEVICE WITH ARTICULATED RECTANGULAR FRAME

REFERENCE TO RELATED APPLICATIONS

The present application is not related to any pending or issued United States of America or foreign patent or patent application.

BACKGROUND OF INVENTION a. Field of Invention

The present invention is directed to pet waste collection systems for use with dogs, cats, and other pets to collect their solid waste. The present invention system includes a main housing having a hollow inside and has a top, a bottom, a front, and a back and at least one sidewall, and has an opening accessible to the hollow inside area. There is also a telescopically or moveable, extendable and contractible pole attached that allows opening and closing of a collapsible frame at a first end to the hollow inside area of the main housing and attached to a collapsible frame at its second end. The collapsible articulated rectangular frame unfolds for a waste receptacle, i.e. a "pooper" bag, and is spaced behind the pet during defecation. In some embodiments, an attachment hook is located on said main housing for attachment thereof to a leash, a belt, or other attachable area or item. In some embodiments, the present invention system devices allow for extension and retraction of the pooper bag frame without that end being touched by the user.

b. Description of Related Art

The following patents are representative of the field pertaining to the present invention.

U.S. Pat. No. 6,554,335 issued to the present inventor herein describes a pet waste collection system for use with dogs, cats, and other pets to collect their solid waste. The present invention system includes a main housing having a hollow inside and having a top, a bottom, a front, and a back and at least one sidewall, and having an opening accessible to the hollow inside area. There is also a telescopically extendable and contractible pole attached at a first end to the hollow inside area of the main housing and attached to a collapsible frame at its second end. The collapsible frame unfolds for a waste receptacle, i.e. a "pooper" bag, and is spaced behind the pet during defecation. In some embodiments, an attachment hook is located on said main housing for attachment thereof to a leash, a belt, or other attachable area or item.

U.S. Pat. No. 2,141,007 describes a shovel comprising walls forming an enclosure open at one end and closed at the opposite end, a sleeve rigid with the closed end of the shovel angularly and rearwardly therefrom, a pair of longitudinally spaced flanges integral with said sleeve, a collar rotatably mounted around the sleeve between said flanges and held from longitudinal movement thereby, a handle extending into and rigidly attached to said sleeve and projecting upwardly and rearwardly therefrom, and a rotary sleeve mounted on the outer end of said handle approximately at right angles to said first named sleeve and facilitating turning of the shovel to extend the open end thereof downwardly and discharge the contents therefrom.

U.S. Pat. No. 3,052,214 describes a disposable catcher for trapping and containing excrement and the like for disposal thereof, said catcher comprising, in combination, a bag holding and operating means comprising a stick, said stick comprising connecting rod and a connecting tubular rod holder disposed therearound to limit movement of said rod between a forward lid open and a rearward lid closed position, and a disposable bag readily detachably connected to said stick, said bag comprising a disposable bag body and a movable lid, said lid being readily detachably connected to said connecting rod and said bag body being detachably connected in supporting position to said connecting rod holder, whereby said lid can be moved to open and closed positions by movement of said connecting rod, said bag being readily detached from said stick by detachment of said lid and said bag body from said connecting rod and connecting rod holder, respectively.

U.S. Pat. No. 3,139,299 describes a refuse collector, comprising in combination: an elongated and vertically extending tube element, said tube having an outlet at the bottom thereof; an elongated element in longitudinal sliding in relationship and by the tube element, one of said elements being rigid and having a handle section for manipulating the collector; a bowl carried by and at the lower end of one of said elements; a scoop for the bowl; means for pivotally connecting the scoop to both of said elements; means coupling the upper end of the tube with a source of fluid; and a manually actuated valve carried by the tube for controlling the flow of liquid through the tube.

U.S. Pat. No. 3,281,178 describes a device for collecting and disposing of animal fecal matter, comprising, in combination, a handle, a first frame element, a second frame element, one end portion of said first frame element being spaced apart from and oppositely positioned with respect to one end portion of said second frame element, the other end portion of said first frame element being connected to said second frame element, said handle member being transversely positioned with respect to both said first frame element and second frame element and being connected to said connected first and second frame elements, and a bag member removably attached to said connected first and second frame elements at their respective one end portions spaced apart and oppositely positioned with respect to each other, said bag member having a collar and a body portion integral with said collar, said collar being sealed to said body portion at least two opposite points thereof, each of said two opposite points being between said two spaced apart and oppositely positioned end portions of said first and second frame elements, said collar being positioned over said two spaced apart and oppositely positioned end portions of said first and second frame elements, said body portion being positioned between said first and second frame elements, whereby said device can be easily used without any fecal matter to be collected contacting the frame elements and whereby said bag member can be easily removed and then closed and sealed by raising and inverting one side of said collar.

U.S. Pat. No. 3,286,826 describes a portable combination flat package for use in removing dog refuse from an area in which it is deposited including: a flexible fibrous container in the form of a sack having an open end that is defined by first and second flat side walls, two end walls and a bottom, with said end walls and bottom having centrally disposed fold lines formed therein that extend the length thereof, and said first side wall includes as an integral part thereof an extension that projects beyond said open end, which container is selectively disposable in either a first position in which it is flattened, a second positioned in which it is expanded to receive dog refuse through said open end when said extension is placed in contact with the surface on which said refuse rests, and a third position in which said container is rolled upon itself with said refuse within the confines thereof, with said extension when said container is in said third position being wrapped thereabout to seal the same; a rectangular sheet of cardboard of substantial stiffness disposed within said container when in said first position to prevent lateral creasing of said container, which sheet has a plurality of spaced fold lines formed therein that extend longitudinally and transversely therein which aid in shaping said sheet into a scoop when said sheet is removed from said container, and when said sheet is so shaped it defines two parallel longitudinally extending flanged that act as stiffeners, in the use of said scoop to pick up refuse and deposit the same together with said sheet in said container when in said second position; and, tie means within said container in said third position for holding said container in said third position with said refuse and sheet within the confines thereof with said extension being wrapped around said container to seal the same.

U.S. Pat. No. 3,431,008 describes a portable scavenging apparatus for removing feces of animals and other untouchable objects comprising a box having an opening therein and a lid adapted to selectively close and open said opening, a stick having a first end mounted to a wall of said box, means for moving said lid selectively between its closed and open positions including a lever, a link, an arm, and a spring, said lever being pivotally mounted at a predetermined point intermediate its ends to said stick at a predetermined point adjacent the second end of said stick, a handle mounted in fixed position to said stick to provide a stationary member toward which one end of said lever may be manually pivoted, said spring being interposed between said handle and said lever to normally urge said one end of said lever away from said handle, said link being attached to the opposite end of said lever so as not to be moved away from said handle when said lever is manually pivoted toward said handle, said link being mounted to said arm and said arm being operative when said lever and said link are moved to move said lid between its closed and open positions.

U.S. Pat. No. 3,446,525 describes in a portable pickup device for grasping and transporting unclean material such as animal droppings and the like, said device having an elongated body provided with a handle at one end: pickup means carried at the other end of the body including a pair of pickup members in virtually parallel planes, said pair of pickup members including parallel bottom straight portions cooperable to move along a surface in close relation thereto whereby at least one straight portion is adapted to move beneath a dropping to be picked up, at least one of said pickup members being an open frame; means for moving at least one of the pickup members to and away from the other; and a disposable compliant wrapping means received and held on said pickup means with an opening at said bottom portions, the open frame pickup member being adapted to permit outward lateral displacement of said compliant wrapping means when a dropping is lifted by said straight portions of the pickup means for containing the dropping in said wrapping means at one side of the pickup means.

U.S. Pat. No. 3,560,039 describes an apparatus for handling and disposing of animal excrement and the like comprising in combination a tong member including a pair of levers pivotally connected together intermediate their ends, loop handle portions at one end of each of said levers, the other end of each of said levers having a transverse elongated scoop portion which curves concavely inwardly toward the opposite lever whereby said scoop portions form a closed-end scoop when said long end member is in the closed position, and tissue-retaining means on said tong member for retaining a package of tissues therein, said tissue retaining means including a receptacle connected to one of said pair of levers and a removable cover on said receptacle having an opening therein for the removal of tissues from said receptacle.

U.S. Pat. No. 3,606,436 describes a portable device for picking up objects underfoot comprising: a first assemblage including a first blade-like member secured to the lower end of a first operating rod and projecting angularly therefrom; a second assemblage including a second blade-like member secured to the lower end of a second operating rod and projecting angularly therefrom; hinging means pivotally interconnecting said first and second assemblages for pincers-like movement of said blade-like members upon manipulation of said operating rods; and, a bag having a portion of its open end detachably secured to said first blade-like member, another portion of its open end detachably secured to said second blade-like member, and a portion of its closed end detachably secured to one of said operating rods so that the inverted bag is selectively opened and closed by the pinchers-like movement of said blade-like members resulting from manipulation of said operating rods.

U.S. Pat. No. 3,659,891 describes a refuse collecting device having an improved tubular bag-mounting member at the lower end of a handle for collecting refuse such as animal leavings and the like. The refuse is collected in a disposable bag removably mounted on the tubular element in an improved manner for positive association with the tubular element during use while yet providing for facilitated withdrawal of the bagged matter in a sanitary manner.

U.S. Pat. No. 3,676,887 describes a flexible bag body portion that has a substantially rigid blade element permanently attached to one side wall thereof adjacent the open mouth of the bag body portion. A flexible closure flap is carried by the opposite side wall of the bag body portion and has an adhesive sealing area coact with a like area on the side wall of the body portion carrying the blade element. The bag is sealed with the litter and the blade element therein prior to disposal.

U.S. Pat. No. 3,716,263 describes a device for collecting articles and substances, comprising in combination: a handle; an adjustable shaft surmounted by said handle; a pair of outwardly inclined arms depending from said adjustable shaft; pivotal means depending from said arms; said pivotal means being normally maintained in an inclined, open position by spring means depending from said arms; said pivotable means being disposable into a horizontal, closed position when said pivotable means are in abutment with a surface and said handle is depressed; descendable means depending from said arms and contactable with said pivotable means when it is in said closed position, thereby obstructing the return of said pivotable means from said closed to said open position.

U.S. Pat. No. 3,757,737 describes a mechanical device for sequentially loading multiple bodies of animal dropping from the ground in to a disposable bag. The illustrated device has an elongated handle which carries a pickup means at its lower end. The pickup means includes means for releasably holding a bag with the mouth of the bag held open in a generally vertical plane, and a movable paddle proportioned and arranged to engage and propel a body of animal droppings into the bag through the open mouth. The movement of the paddle is remotely controlled from the upper end of the handle by a manually movable lever which is operable to impart a rapid propelling movement to the paddle.

U.S. Pat. No. 3,778,097 describes a device for retrieving litter that has manually actuated positioning means connected to a litter receptacle holder and a pushing member adapted to be enclosed in an envelope releasably secured about the pushing member. Actuation of the positioning means causes coaction between a litter receptacle mounted in the litter receptacle holder and the enveloped pushing member, so that litter is forced into the litter receptacle and held in the litter receptacle by the pushing surface. While the litter is being held within the litter receptacle by the enveloped pushing member, the envelope is released from about the pushing member and reversed to envelope the opening of the litter receptacle. The litter receptacle can then be manually ejected into the envelope when the positioning means are actuated to move the pushing member away from the litter receptacle.

U.S. Pat. No. 3,786,780 describes a portable canine toilet, in combination a holder and disposable waste receiving means adapted to be removably fitted upon the holder. The holder has a projecting means mounted on its rod portion, and the receiving means has a partially circumferential sleeve along its upper portion and into which the lower part of the holder is inserted. The receiving means also has a stringed collar at the top of the upper portion, the protruding portion of the string normally positioned on the projecting means.

U.S. Pat. No. 3,804,448 describes an elongated light weight shaft that has at one end a handgrip portion and at the other end a scavenging scoop receptacle with an inlet opening facing transversely of the length of the shaft. An electric light on or near the handgrip portion illuminates the receptacle inlet and the locale adjacent thereto. The implement may be manipulated by one hand of a user while the user is standing in his normal upright position. The scoop receptacle may include, or support, a detachable disposable container or liner. A closure lid is hingedly mounted relative to the scoop receptacle so that the lid can be moved into an open position while the receptacle is in scooping position and into closed position upon completion of the scooping operation, selectively, by manipulation of the shaft by the supporting hand of user. A pusher tool or brush is carried by the shaft near the receptacle. Propelling means are provided in the receptacle and are operable manually to propel the material scooped into the entry of the receptacle farther into the receptacle and away from the inlet opening so that the material can be carried in the receptacle without danger of spillage even with the shaft carried substantially upright.

U.S. Pat. No. 3,819,220 describes a sanitary device for pets which comprises a wand having at one end a pair of spring arms which normally are biased apart. A disposable receptacle having sleeve portions around its normally open top has such portions fitted on said arms to be held open thereby and positioned beneath a pet to receive feces as the latter is discharged. The receptacle is fitted on the arms; the arms squeezed together, the receptacle wrapped around the arms and a sleeve telescoped on the wand to retain the device in readiness. After use, the receptacle may be expelled from the arms by extending the sleeve.

U.S. Pat. No. 4,019,768 describes a device for sanitary pickup of ground deposited excrement comprises a metal frame structure having an excrement engaging pickup portion and a conventional bag supporting portion. Said bag holding portion positively retains a conventional shopping bag on the holding portion in a manner to hold the mouth of the bag open for ready reception of the said excrement together with additional structure supported by the handle for quick and easy release of said bag from positive retention on the support portion. Additional covers are also provided for the excrement engaging portion of the device to increase the usefulness of said device.

U.S. Pat. No. 4,215,887 describes a pickup device of highly functional yet inexpensive construction, comprising a pair of loop-shaped portions that are hinged together, with the loop-shaped portions being movable to a widely separated position such that an inverted bag that has been partially turned inside out may be inserted between the loops. Handle portions located above the hinge locations are able to be grasped by the user and brought together, with such action serving to bring base portions of the loops, as well as certain neck portions of the bag together. This action makes the device readily adaptable for the picking up of material from a floor or sidewalk, such as that deposited by an animal, with this arrangement advantageously serving to cause the removed material to be enveloped in the bottom portion of the bag, with the upper portions of the bag thereafter being easily brought together and tied, and with the exterior of the bag and the pickup device remaining unsoiled throughout the entire procedure.

U.S. Pat. No. 4,243,259 describes a device for easy, clean and sanitary picking up and disposal of pet feces, the device being a trough-like member having opposed sides and dimensioned for insertion into the open end of a bag with the bag draped over the sides to define a concave feces-receiving area; and means on the member remote from the open end of the bag for tentatively securing the bag to the member while the open bag end is engaged and rolled back on itself to an inverted bag position containing within the bag feces deposited on the prepared area of the bag.

U.S. Pat. No. 4,323,272 describes a hand portable and single hand operable device for picking up animal excrement and the like comprised of a pair of metal rods fixed close enough together at one end as V shaped extensions from a spring loop to form a handle portion for grasping with one hand about both rods which are deflectable toward each other by pressure of the hand. At the other end of each of the rods is a bag support member comprised of an elongated bag support wire loop formation having two substantially parallel width portions and two opposed length portions with length portions farthest from the handle portion in each bag support loop formation being straight and parallel to each other and moveable toward each other into line contact with each other by deflection of the rods. A bag having flexible sidewalls and an opening with a cuff is mounted on the respective bag support wire loop formation in a manner that the opening is at and controlled by the parallel straight portions of the bag support loop formations.

U.S. Pat. No. 4,341,410 describes a frame that comprises a handle and a pair of legs extending therefrom with the handle being substantially U-shaped and having a taut wire spanning the distal ends of the legs. A plastic or paper bag is engaged between the legs with one side of the open end folded over the taut wire and the legs and the forefinger of the hand holding the handle engaging the other side of the open end and tensioning the same against the wire. This holds the bag in the open position. The primary use is for scooping up waste material from animals such as dogs but it can also be used to hold a bag upright in the open position with one hand so that the bag can be filled with material by the other hand. It can also be used in industry for sanitary sampling of granular, comminuted, or liquid materials. In one embodiment the frame is foldable for easy storage.

U.S. Pat. No. 4,900,077 describes a device, storable in a pocket or purse, containing two extendable arms, attached to each other at one end, which spread apart when extended due to spring action. In this extended position the arm tips and apex, each having a nubble, are in triangular arrangement so that a disposable bag can be stretchably attached over the nubbles at these three points, thus covering the fork arms and protecting them from soiling. In this method the bag is used as a receptacle for dog feces which is pushed into it with a small stick or other disposable material. After use the arms are pushed back into the handle of the device so that it can be discreetly stored.

U.S. Pat. No. 5,203,598 describes a sanitary scooper is arranged to include a handle mounted at an oblique angle relative to a support tube, with the support tube mounting a control head at its forward distal end. The control head includes a pivot head rotatably mounting first and second actuator arms, wherein the handle includes a trigger lever, and upon depressing, the trigger lever effects projection of the first and second actuator arms towards one another, with a "V" shaped support frame mounted to the actuator arms and a support bag member mounted to the support frame to enclose waste and debris there within.

U.S. Pat. No. 5,269,575 describes a dog waste scoop is provided which consists of an elongated handle having a hand grip at an upper end, a flat tray having a center slot, a bracket for securing the flat tray to a lower end of said elongated handle, so that said flat tray will project outwardly from the elongated handle opposite from the end grip. A disposable plastic bag having a closed end and an open end is also provided. The closed end can be inserted into the center slot in the flat tray with the open end flattened down upon the flat tray, so that dog feces can be deposited into the disposable plastic bag for removal.

U.S. Pat. No. 5,290,080 describes a pooper scooper for disposing of solid wastes from a pet animal, comprises a relatively short body having a hollow portion provided in its interior and extending along a bottom portion thereof, the hollow portion having an opening at one end thereof, a linear slit extending along the bottom portion of the body, and a housing portion for carrying vertical stacked cartridges therein, the housing portion being provided in the interior of the body, situated on the hollow portion and communicating with the hollow portion, each of the cartridges including a pair of casing members hingedly connected at one ends thereof to each other and a sack supported and contained between the casing members in a manner to be folded up, a pair of receiving members movably inserted in the hollow portion for receiving a lowermost one of the cartridges, a pusher movably inserted within the hollow portion for pushing out of the opening of the hollow portion the lowermost cartridge received by the receiving members, the receiving members pivotally connected at one ends thereof to the pusher, between which receiving members a spring is stretched, to thereby always urge the receiving members to be opened away from each other, cooperating members on the receiving members and the casing members to be separately held on the receiving members when each of the cartridges is received by the receiving members, and a button arranged on an outer surface of the bottom portion of the body and supported through the slit of the body to the pusher.

U.S. Pat. No. 5,318,330 describes a device for scooping up and containing dog excreta for later removal comprising two engaging parts one part of which serves as a scoop for use in scraping and excreta into the hollow interior of the other part. A handle comprising two parts is provided which parts individually serve to each support a different one of the parts and when the parts are moved into engagement interlock to form a single handle for supporting the assembled device.

U.S. Pat. No. 5,344,200 describes an implement for disposing of dung of a pet animal adapted to be pointed to a rump of a pet animal by a user to receive dung of the pet animal through a sack, comprises an elongated tubular body having first and second ends, a housing body mounted on an upper wall of the elongated tubular body for carrying vertically stacked cartridges therein, each of the cartridges including a pair of casing members hingedly connected at one ends thereof to each other and a sack supported between the casing members in a manner to be folded up, a pair of receiving members inserted in a longitudinal bore of the tubular body for receiving a lowermost one of tile cartridges when the lowermost cartridge drops down from the housing body toward the bore of the tubular body by gravity, a rod-like pusher movably inserted in the bore of the tubular body for pushing toward the first end of the tubular body the lowermost cartridge received by the receiving members, the receiving members pivotally connected at one ends thereof to the pusher, between which receiving members a spring is stretched, thereby always urging the receiving members to be opened away from each other, and cooperating members on the receiving members and the casing members of each of the cartridges for causing the casing members to be separately held on the receiving members when each of the cartridges is received by the receiving members.

U.S. Pat. No. 5,634,678 describes a low-cost portable structure for a sanitary device for the collection of animal fecal matter is provided with a telescopic handle on which is supported a disposable collection bag by means of a coupling device a portion of which is formed as part of the ring which supports the collection bag and another part of which is coupled to the handle to receive and permit ready engagement of bayonet-like section which form part of the coupling part which is attached to the annular ring supporting the bag. A tongue is also provided which is engaged by a spring-loaded head which facilitates the rapid discharge and of the section which is attached to the ring.

U.S. Pat. No. 5,702,138 describes an animal refuse collector/carrier device consisting of a long rectangular plastic container having a hinged cover at its top with a long rigid carrying handle attached to the cover. Included is a shovel with a collection scoop that is stored inside the container and secured to the handle. A disposable plastic bag is placed inside the container to hold animal feces retrieved using the shovel. The carrying handle includes a hook for fastening a leash while walking a pet. All the materials used, except for the shovel handle, are made of hard plastic and molded to obtain smooth surfaces for easy cleaning. The device is light in weight and inexpensive.

U.S. Pat. No. 6,039,370 describes a portable pet toilet having an elongated pole having first and second ends. The first end provides a handle. Securely mounted on the second end of the pole is a pair of selectively adjustable arms for supporting a disposable receptacle. The arms are adjustable in order to provide the capability of accommodating receptacles of different sizes and shape.

U.S. Pat. No. 7,232,165 describes a portable pet waste collection and disposal device. The portable device comprises a nested wand, where the nested wand has an actuator, a lower end and an upper end. The nested wand has a normal tendency to fully extend itself upon activation by the actuator during deployment of the portable device. The portable device also comprises a prong unit, where the prong unit has a pair of prongs, a first hinge and a second hinge. The first hinge has a normal tendency to spread the prongs, with the second hinge normally tending to rotate the prong unit away from the lower end of the nested wand. The first hinge and second hinge controllably rotate in substantially perpendicular relation to each other. The portable device further comprises a slider coupled to the prong unit, with the slider controllably causing the second hinge to rotate back toward the lower end when the slider is released by the actuator on the nested wand at a first end. The slider has a retainer bracket at a second end for retaining the spreading of the pair of prongs during deployment of the portable device. The portable device further has a disposable bag with a folded rim around the bag's opening, where the folded rim is adapted to receive the prongs. The disposable bag has a drawstring around its opening for controllably tightening the opening upon collection of the pet waste.

U.S. Pat. No. 7,448,659 describes a system for picking up solid objects, such as pet debris and pet waste, and automatically sealing such pet waste within a disposable liner. The liner is installed on a hand-held scooper device by an automatic applicator. The liners are design specifically for the system and comprise a self-sealing feature adapted to assist in encapsulating the waste. The applicator also functions as a storage holder for the hand-held scoop. A kit comprising the hand-held scoop device, the storage automatic applicator, and disposable liners is also disclosed.

U.S. Pat. No. 7,841,303 describes an extendible lead with an integrated excrement collector, with the lead including a casing with a collection drum. The excrement collector includes a tubular body having telescopic sections and having a flexible wire inside. One end of the wire is disposed in an opening of the tubular body and forms a lasso. A second end of the wire extends through the tubular body and out of the other end of the body and is connected to a handle.

U.S. Pat. No. 7,845,695 describes a waste collection device that includes a sweep that includes a plate and a first handle, and a scoop that includes a receptacle and a second handle. The first handle is attached to the plate and the second handle is attached to the receptacle. The disclosure also describes a method of picking up animal waste that includes contacting the waste with the plate of a sweep and sweeping the waste into a receptacle of a scoop through an opening of the receptacle.

U.S. Pat. No. 7,854,455 describes an animal waste collection system designed for sanitary use consists of a hollow shaft, handle, light, a pair of resilient, curved arms and a plurality if self-sealing bags. The operator of the device initially loads a plastic bag onto arms before walking the dog. When the animal shows signs of excreting, the bag is placed under the rear of the animal to intercept the feces. Once the animal is finished excreting, the operator partially retracts the arms, closing the bag, and walks to a disposal receptacle where the arms are then fully retracted and the sealed bag is released.

U.S. Pat. No. 8,292,339 describes a system for picking up objects—such as pet waste, debris, and similar noxious materials—and automatically sealing objects within a disposable liner. The liner is installed on a hand-held scooper device by an automatic applicator. The liners comprise a self-sealing feature adapted to assist in encapsulating the waste. The applicator also functions as a storage holder for the hand-held scoop.

U.S. Pat. No. 8,550,511 describes a portable apparatus for extracting and properly disposing of refuse such as, for example, excrement. The apparatus includes a storage chamber for storing extracted refuse wherein the storage chamber is distinct from the extraction mechanism for extracting the refuse. The apparatus further includes a pumping mechanism for pumping fluid from a fluid source through a fluid conduit and into the storage chamber.

U.S. Pat. No. 9,382,679 describes a portable apparatus of component parts aligned and detachable from one another in such a way as to allow for sanitary and ergonomic collection, hands-free transportation, and environmentally optimal disposal of pet waste. The apparatus comprises a cylindrical container that when assembled with a removable base and removable lid creates an airtight container enhanced with a disposable, flushable liner that fits in the interior of the waste collection container. The top of the lid incorporates a, telescoping handle, while the underside of the lid incorporates a shovel unit that fits inside the container and is offset and aligned in close proximity to the walls of the container to ensure ample room for both the shovel unit and collected pet waste when the removable lid and base are both attached to temporarily seal the container. The apparatus also comprises a removable base cap that when attached to the base of the closed container creates a compartment separate from the collected pet waste. The apparatus is designed for portability with a clip or tether means for attaching it to the user's articles of clothing or mode of transportation.

U.S. Pat. No. 9,422,683 describes embodiments of a foldable scooper for use in picking up animal waste. The scooper can be folded and configured to attach to a leash or be inserted into a user's pocket, thereby making it hands free. In some embodiments, the foldable scooper can be wrapped by a waste bag, thereby allowing a user to pick up animal waste without ever coming in contact with the waste.

U.S. Pending Patent Application Publication. No. 2006/0181091 describes a portable pet waste collection and disposal device. The portable device comprises a nested wand, where the nested wand has an actuator, a lower end and an upper end. The nested wand has a normal tendency to fully extend itself upon activation by the actuator during deployment of the portable device. The portable device also comprises a prong unit, where the prong unit has a pair of prongs, a first hinge and a second hinge. The first hinge has a normal tendency to spread the prongs, with the second hinge normally tending to rotate the prong unit away from the lower end of the nested wand. The first hinge and second hinge controllably rotate in substantially perpendicular relation to each other. The portable device further comprises a slider coupled to the prong unit, with the slider controllably causing the second hinge to rotate back toward the lower end when the slider is released by the actuator on the nested wand at a first end. The slider has a retainer bracket at a second end for retaining the spreading of the pair of prongs during deployment of the portable device. The portable device further has a disposable bag with a folded rim around the bag's opening, where the folded rim is adapted to receive the prongs. The disposable bag has a drawstring around its opening for controllably tightening the opening upon collection of the pet waste.

U.S. Pending Patent Application Publication. No. 2009/0152884 describes an animal waste collection system designed for sanitary use consists of a hollow shaft, handle, light, a pair of resilient, curved arms and a plurality if self-sealing bags. The operator of the device initially loads a plastic bag onto arms before walking the dog. When the animal shows signs of excreting, the bag is placed under the rear of the animal to intercept the feces. Once the animal is finished excreting, the operator partially retracts the arms, closing the bag, and walks to a disposal receptacle where the arms are then fully retracted and the sealed bag is released.

U.S. Pending Patent Application Publication. No. 2013/0062895 describes a pet waste collection apparatus includes a main frame body including a loop portion, a frame handle attached to the loop portion, and a pair of opposed hooks extending outwardly from the frame handle near an area thereof where it attaches to the loop portion. The main frame body may be formed from solid or coated wire. In use, bag handles of a disposable handled bag are placed over the hooks, and the upper edge of the main bag body is then placed over the loop portion where it fits tightly. The bottom portion of the bag is then fed through the loop portion, and a unit of pet waste is moved through the loop portion and into the plastic bag.

Notwithstanding the prior art, the present invention is neither taught nor rendered obvious thereby.

SUMMARY OF INVENTION

The present invention is directed to a pet waste collection system, which includes: a main housing, a sliding pole, and a collapsible frame. The main housing has a hollow inside area with top, bottom, front and back walls and at least one sidewall, and has an opening accessible to the hollow inside area. The main housing further includes a recessed wall area adapted for nesting of a collapsible frame, and at least one orifice on the back wall for movement of a portion of a sliding pole. The sliding pole has a proximal end positioned backwardly away from the mentioned at least one orifice, and it has a distal end positioned forwardly away from the at least one orifice, such that the sliding pole rests within the at least one orifice, the sliding pole distal end is connected to a section of a slidable, collapsible frame for extension and contraction thereof, and has an extended position wherein the pole distal end and the collapsible frame are located outside of the hollow inside area and the collapsible frame is open and extended, and has a contracted position wherein the distal end of the pole is contracted into the hollow inside area and the collapsible frame is collapsed and located inside of and nested in the hollow inside area. The collapsible frame is for a holding a waste receptacle, such as a pooper bag, and is formed of at least two unconnected frame sections, and movably related to movement of the pole, at least a first frame section being a frame section connected to the pole distal end for movement therewith, and at least a second frame section that is positioned to be pushed by the movement of the pole and to be pulled by opposite movement of the pole with the first frame section. These at least two unconnected frame sections have a first position and a second position, wherein the first position is a collapsed position, being a retracted, closed position within the main housing hollow inside area, and the second position is an extended, open position outside of the main housing hollow inside area, and further wherein one frame section of the at least two unconnected frame sections is a leading straight linear frame section for positioning closest to the rear of a pet to create a wide linear edge area for efficient pet waste collection. The straight linear frame section provides the widest span of the bag edge that is placed under the pet behind during use to minimize target error.

In some embodiments of the present invention pet waste collection system, all of the frame sections are linear and when in the open position are in the shape of a rectangle from a top view.

In some embodiments of the present invention pet waste collection system, the main housing includes a waste receptacle storage area for storing a plurality of unused waste receptacles. In some of these embodiments of the present invention pet waste collection system, the main housing includes a waste receptacle storage area which is located in a position on the main housing which is below the recessed wall area. In some of these embodiments, the storage area is an enclosed area with open and close access.

In some embodiments of the present invention pet waste collection system, there are at least four linear frame sections, including one leading frame section, one trailing frame section, at least one left frame section and at least one right frame section, the leading frame section and the trailing frame section being parallel to one another.

In some embodiments of the present invention pet waste collection system, the slidable pole has a two-pronged distal end connected to the at least one frame section and the back wall has two corresponding orifices, each of which hold one the two prongs. In some of these embodiments, there is a rear frame section and a front frame section, wherein the rear frame section has at least one passageway for the pole and the at least one passageway has a smaller size that the at least one orifice and the pole has two sections, a rear section and a front section, and the cross-section size of the front section is less than the cross-section size of the rear section.

In some embodiments of the present invention pet waste collection system, the main housing is made of a plastic material.

In an alternative embodiment of the present invention pet waste collection system, there is a main housing, a handle, a telescopic pole, and a collapsible frame. The main housing has a hollow area inside and has a top, a bottom, a front, and a back and two sidewalls, and has an opening accessible to the hollow inside area located at the front. The handle is connected to and extends backwardly from the main housing. The telescopically extendable and contractible pole is located within the main housing, and has a distal end connected to an articulated, foldable rectangular frame. In some preferred embodiments, the handle is hollow and the telescopically extendable and contractable pole is at least partially within the hollow handle when in its contracted position. This decreases the overall length of the device without shortening the pole itself. The rectangular frame has a rear frame section, at least two left side frame sections, at least two right side frame sections, and a front frame section, wherein the rear frame section is connected to the pole and the front frame section is hingedly connected to the rear frame section via the side frame sections, and wherein the rectangular frame has a first, closed position in which the front frame section is folded over to the rear frame section, and has an open position in which the front frame section is unfolded and away from the rear frame section, and further wherein the front frame section includes a linear frame portion for positioning closest to the rear of a pet to create a wide linear edge area for efficient pet waste collection. In some of these embodiments there are two left side frame sections and two right side frame sections. In some of these, all of the two left side frame sections and the two right side frame sections are the same length.

In some of these embodiments, the rectangular frame is in its first, closed position and the pole is retracted and the closed frame is positioned in the main housing. In some of these embodiments, the main housing has a hinged front door connected thereto. In some of these embodiments, the main housing includes a waste receptacle storage area for storing a plurality of unused waste receptacles. In some of these, the main housing includes a waste receptacle storage area which is located in a position on the main housing which is below the recessed wall area. In some of these embodiments, the waste receptacle storage area is an enclosed area with open and close access. In some of these embodiments, the main housing is made of a plastic material.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE SEVERAL VIEWS OF THE DRAWINGS(S)

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

The present invention is directed to a novel pet waste collection device that relies upon extension and contraction of a frame to support a receptacle (pooper bag), and uniquely has a slider component that either moves in and out or telescopes in and out for deployment and storage of the frame while providing maximum width.

Figure 1:
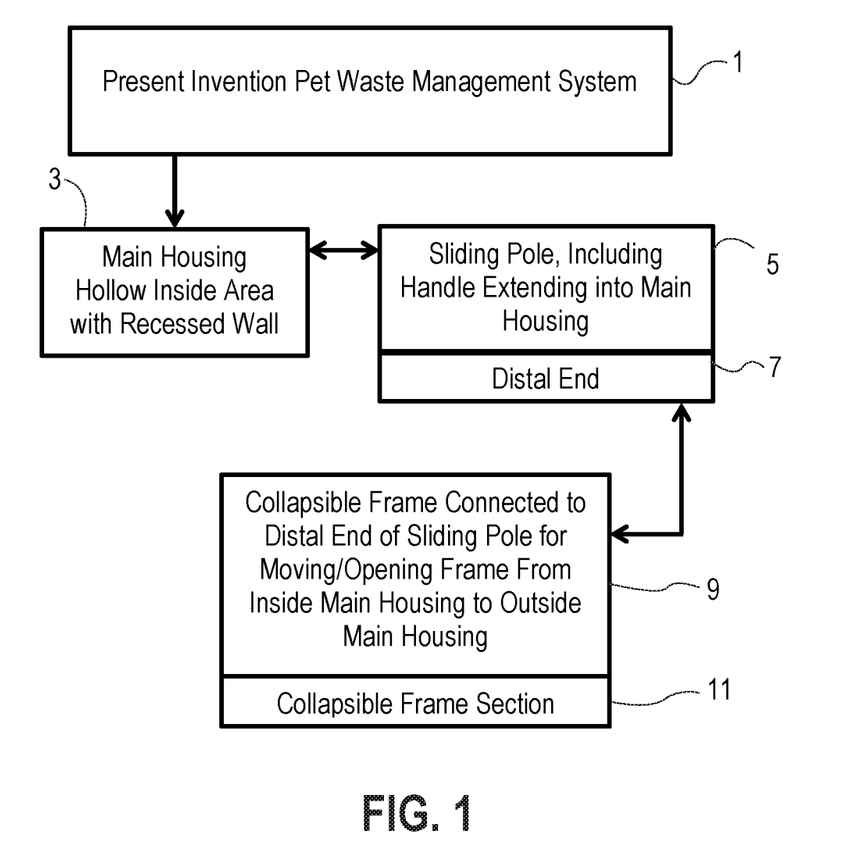
FIG. 1 shows a schematic diagram of some general features and details of one version of a present invention pet waste collection device with articulated rectangular frame.

FIG. 1 shows a schematic diagram of some general features and details of one version of a present invention pet waste collection device with articulated rectangular frame. This pet waste collection system 1 includes a main housing 3 having a hollow inside area and having a top, a bottom, a front, and a back wall and at least one sidewall, and having an opening accessible to the hollow inside area, the main housing further including a recessed wall area adapted for nesting of a collapsible frame, and at least one orifice on the back wall for movement of a sliding pole. The sliding pole 5 both a slider for deploying the frame 9, and is a handle. The sliding pole 5 has a proximal end positioned backwardly away from the at least one orifice and has a distal end 7 positioned forwardly away from the at least one orifice such that the sliding pole rests within the at least one orifice, the sliding pole distal end being connected to section 11 of a slidable, collapsible frame 9 for extension and contraction thereof. There is an extended position wherein the pole distal end and the collapsible frame are located outside of the hollow inside area and the collapsible frame is open and extended, and there is a contracted position wherein the distal end of the pole is contracted into the hollow inside area and the collapsible frame 9 is collapsed and located inside of and nested in the hollow inside area. The collapsible frame 9 for holding a waste receptacle, is formed of at least two unconnected frame sections, and movably related to movement of the pole, at least a first frame section being a frame section connected to the pole distal end for movement therewith, and at least a second frame section that is positioned to be pushed by the movement of the pole and to be pulled by opposite movement of the pole with the first frame section, wherein the at least two unconnected frame sections has a first position and a second position, wherein the first position is a collapsed position, being a retracted, closed position within the main housing hollow inside area, and the second position is an extended, open position outside of the main housing hollow inside area, and further wherein one frame section of the at least two unconnected frame sections is a leading linear frame section for positioning closest to the rear of a pet to create a wide linear edge area for efficient pet waste collection.

Figure 2:
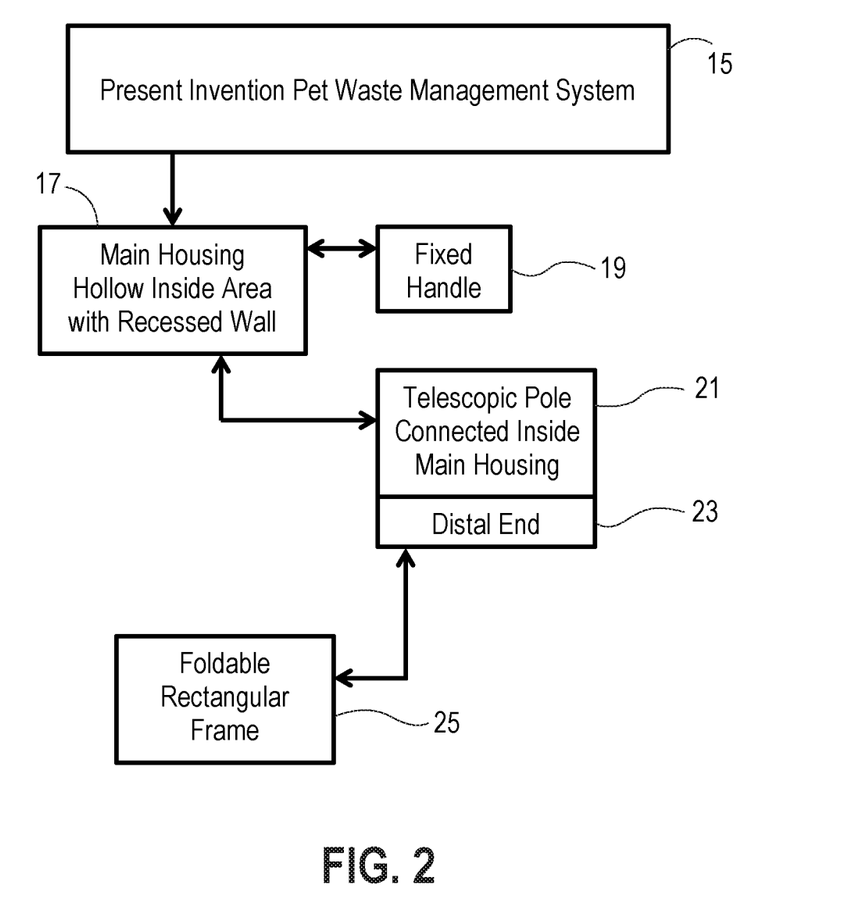
FIG. 2 shows a schematic diagram of some general features and details of another version of a present invention pet waste collection device with articulated rectangular frame.

FIG. 2 shows a schematic diagram of some general features and details of another version of a present invention pet waste collection device with articulated rectangular frame. This version of the present invention pet waste collection system 15 includes a main housing 17 having a hollow area inside and having a top, a bottom, a front, and a back and two sidewalls, and having an opening accessible to the hollow inside area located at the front. It further includes a hollow handle 19 connected to and extending backwardly from the main housing 17, and a telescopically extendable and contractible pole 21 located within the hollow handle 19 and the main housing 17, and having a distal end 23 connected to an articulated, foldable rectangular frame 25. The foldable rectangular frame 25 has a rear frame section, at least two left side frame sections, at least two right side frame sections, and a front frame section, wherein the rear frame section is connected to the pole and the front frame section is hingedly connected to the rear frame section via the side frame sections, and wherein the rectangular frame has a first, closed position wherein the front frame section is folded over to the rear frame section, and has an open position wherein the front frame section is unfolded and away from the rear frame section, and further wherein the front frame section includes a linear frame portion for positioning closest to the rear of a pet to create a wide linear edge area for efficient pet waste collection.

Figure 3:
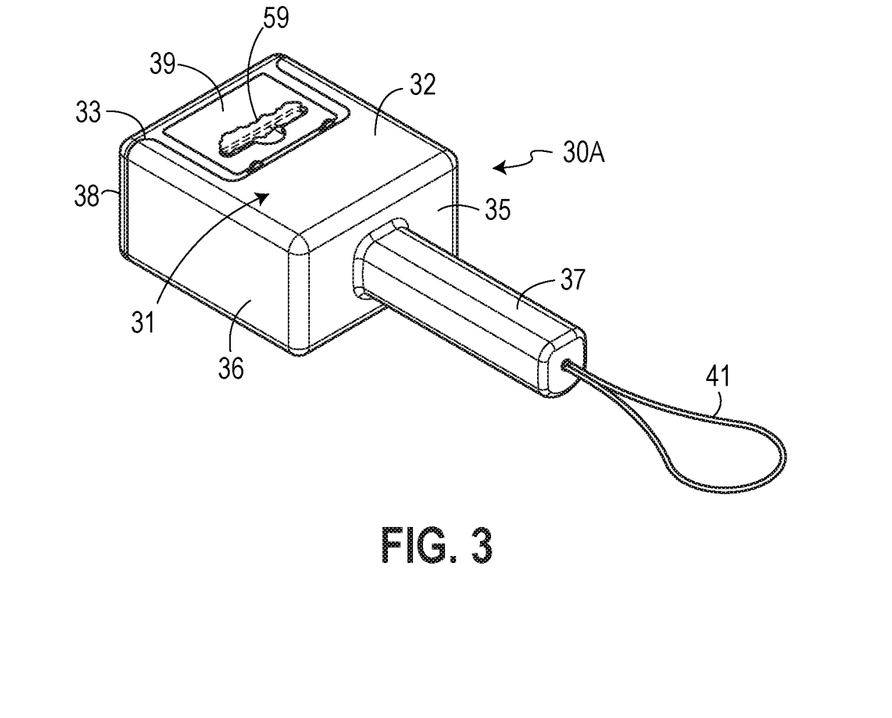
FIG. 3 shows an oblique side view of one embodiment of a present invention pet waste collection device in a collapsed position.
Figure 4:
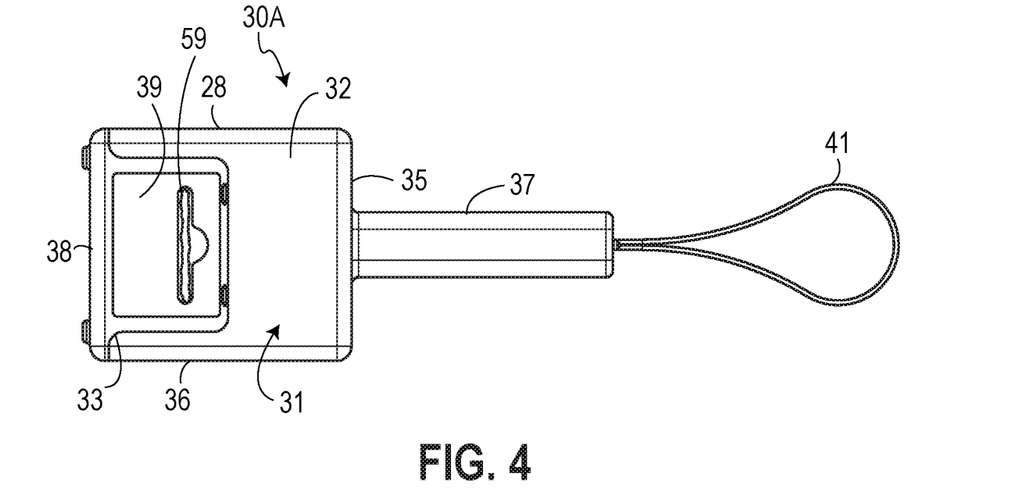
FIGS. 4 and 5 show top and side views thereof, respectively.
Figure 5:
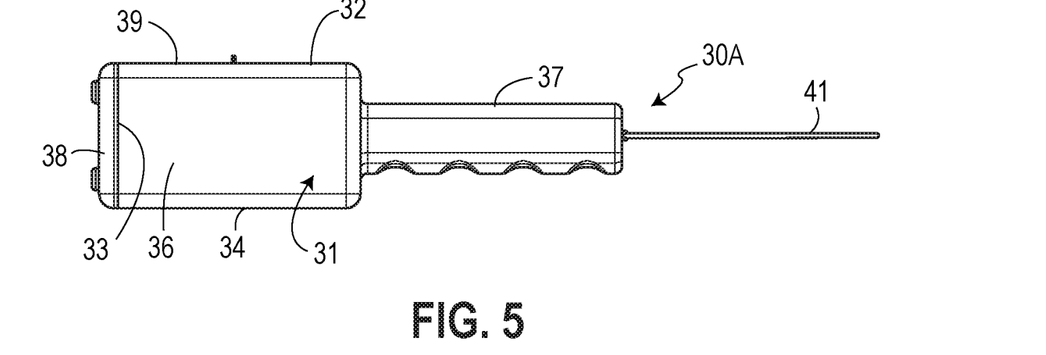

FIG. 3 shows an oblique side view of one embodiment of a present invention pet waste collection device 30A in a collapsed position, and FIGS. 4 and 5 show top and side views thereof, respectively. These three Figures are now discussed collectively, with each component appearing in at least one of FIGS. 3, 4 and 5. Identical parts in each of these three Figures are identically numbered. (In some of these Figures, some components are hidden and thus, not shown or numbered.) Device 30A includes a main housing 31 having a hollow area inside and having a top 32, a bottom 34, a front 38, and a back 35 and two sidewalls 28 and 36, and having an opening 33 accessible to the hollow inside area located at the front 38 and top 32 via swing-down lid 39, with bag holder 59. Hollow handle 37 (with optional wrist strap 41) is connected to and extending backwardly from the main housing 31 and may contain a significant portion of a telescopically extendable and contractable pole. This pole and the rectangular receptacle (pooper bag) holder are hidden in these Figures and these are revealed in the Figures that follow.

Figure 6:
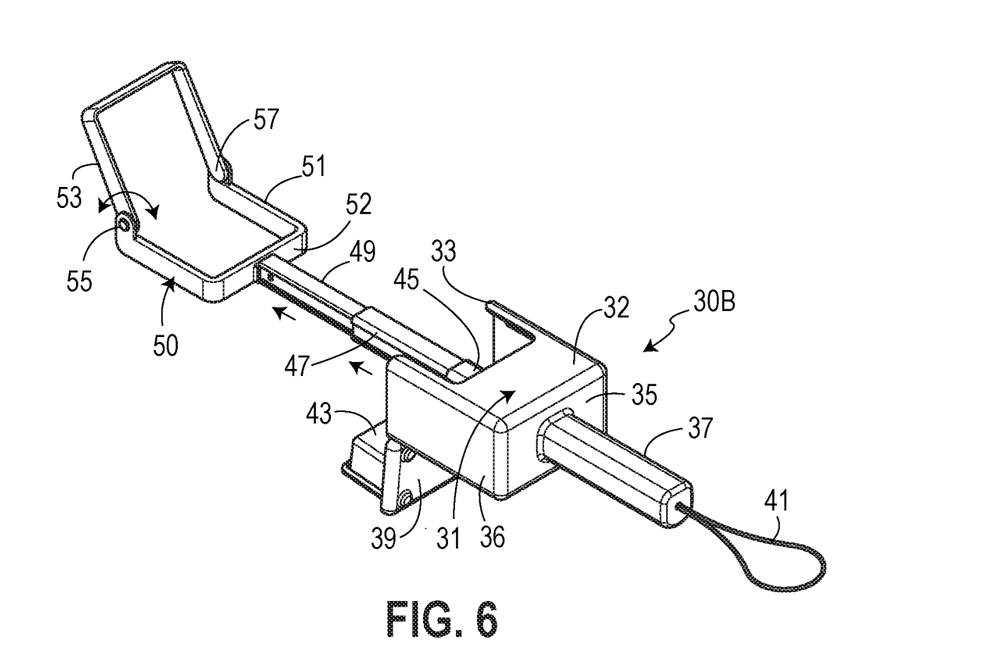
FIG. 6 shows an oblique side view of the present invention pet waste collection device shown in FIGS. 3, 4 and 5, but in an extended position.
Figure 7:
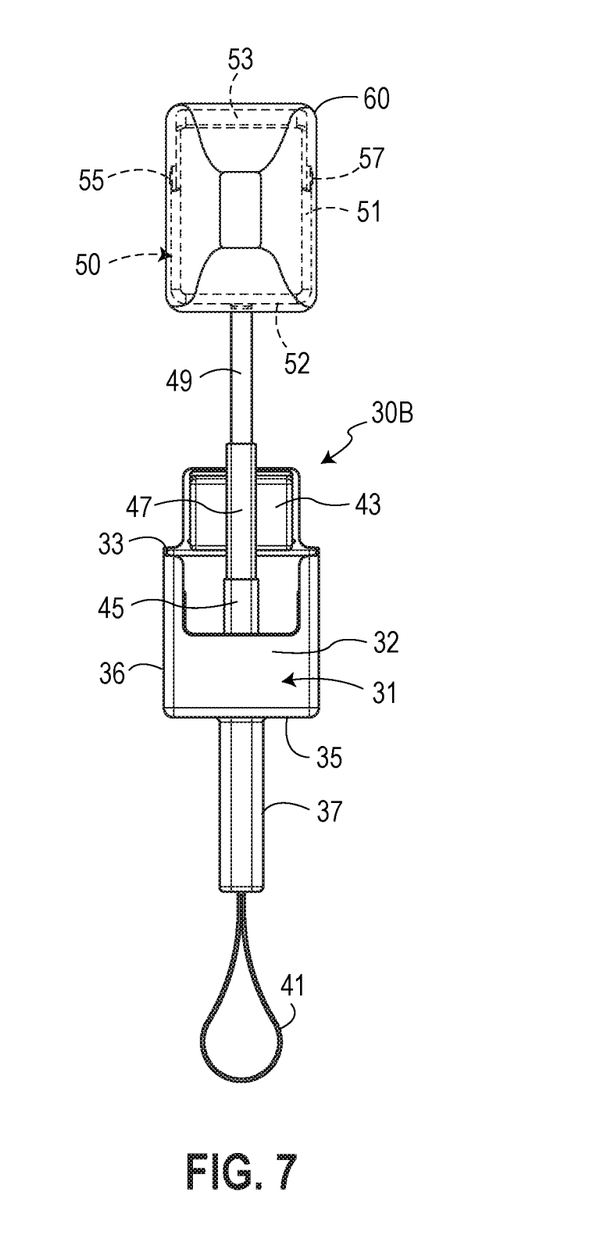
FIG. 7 shows a top view thereof in an extended position.

Now referencing FIG. 6 that shows an oblique side view of the present invention pet waste collection device 30A shown in FIGS. 3, 4 and 5, but now as device 30B in an extended position, and FIG. 7 that shows a top view thereof in an extended position, it is noted that these two FIGS. 6 and 7 are now discussed collectively, with each component appearing in at least one of FIGS. 6 and 7. Further, identical parts in each of these two Figures and the previous three Figures are identically numbered. Hence, a telescopically extendable and contractible pole comprised here of three sections 45, 47 and 49, when contracted are located within the main housing 31 and hollow handle 37, are now shown extended. The pole has a distal end connected to an articulated, foldable rectangular frame, shown generally, as frame 50. Frame 50 requires a rectangular front piece to achieve maximum poop capturing width, but, otherwise, could have many configurations. Here it has two opposing U-shaped components that are hingedly connected to one another. The rectangular frame thus has a rear frame 52 with two side frame sections, such as side 51. Front frame section 53 likewise has side sections, as shown. The front frame 53 and rear frame 52 are connected by symmetrically situated hinges 55 and 57. Further, rear frame section 50 is connected to pole section 49 at its distal end. The rectangular frame 50 has a first, closed position wherein the front frame section 53 is folded over to the rear frame section 51, and has an open position wherein the front frame section 53 is unfolded and away from the rear frame section 51. A pooper bag (receptacle) 60 is stretched over the frame 50 for receiving the pet poop.

A user deploys these present invention devices by opening the lid, extending the telescoping pole, unfolding the frame, attaching the bag and then placing it at the behind of the about-to-be-defecating pet. Alternatively, the bag can be attached at a prior time and the device can be in its contracted position until the pet is ready to defecate, at which time it may be opened, extended, and used to capture the waste. The front frame section includes a linear frame portion for positioning closest to the rear of a pet to create a wide linear edge area for efficient pet waste collection.

Figure 8:
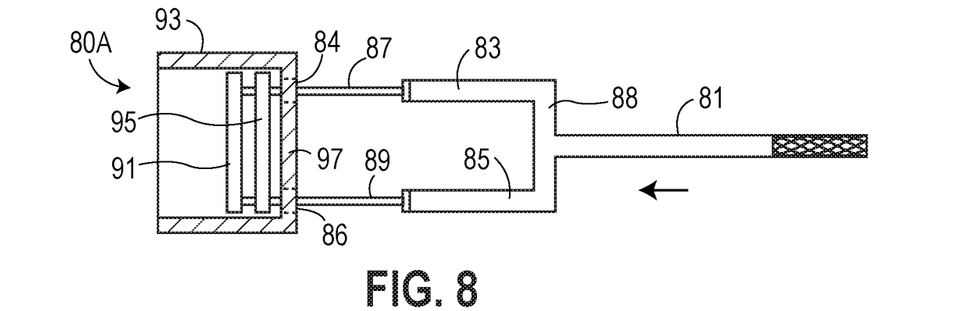
FIG. 8 shows a partially cut top view of the present invention pet waste collection device wherein the handle is a slidable handle that has movement to open and collapse/store the collapsible support frame.
Figure 9:
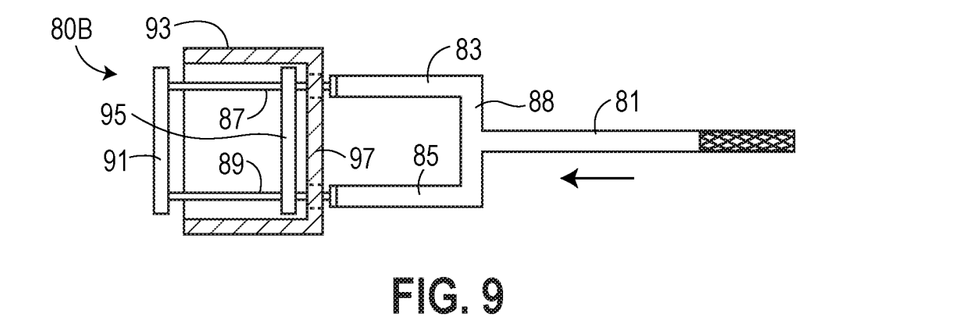
FIGS. 9, 10 and 11 show partial cut top views of the FIG. 8 present invention pet waste collection device embodiment but with the collapsible support frame being more and more extended toward fully open; and, FIG. 12 shows an oblique side view of the present invention pet waste collection device shown in FIG. 8, but fully opened and ready for use.
Figure 10:
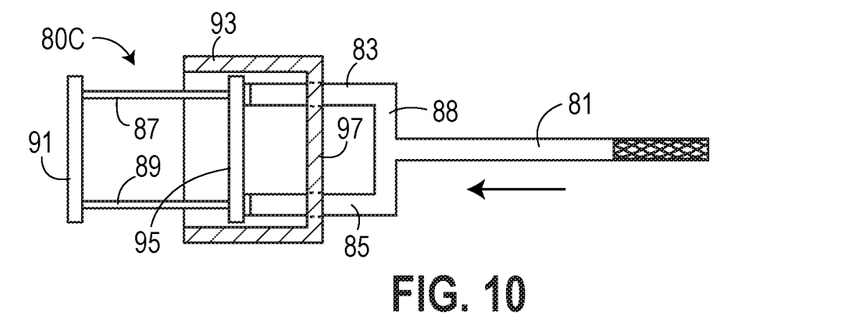
Figure 11:
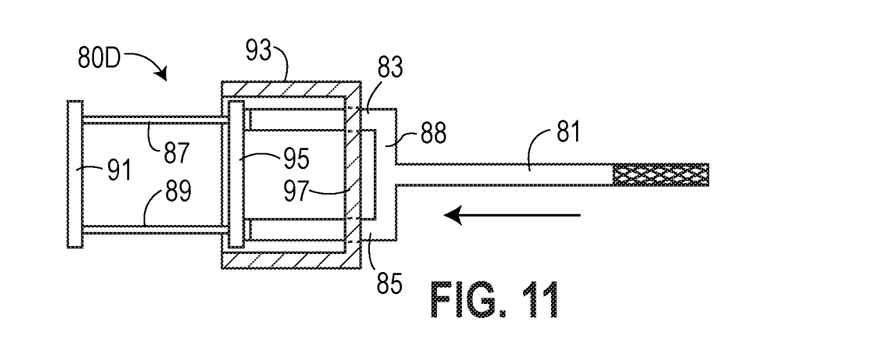
Figure 12:
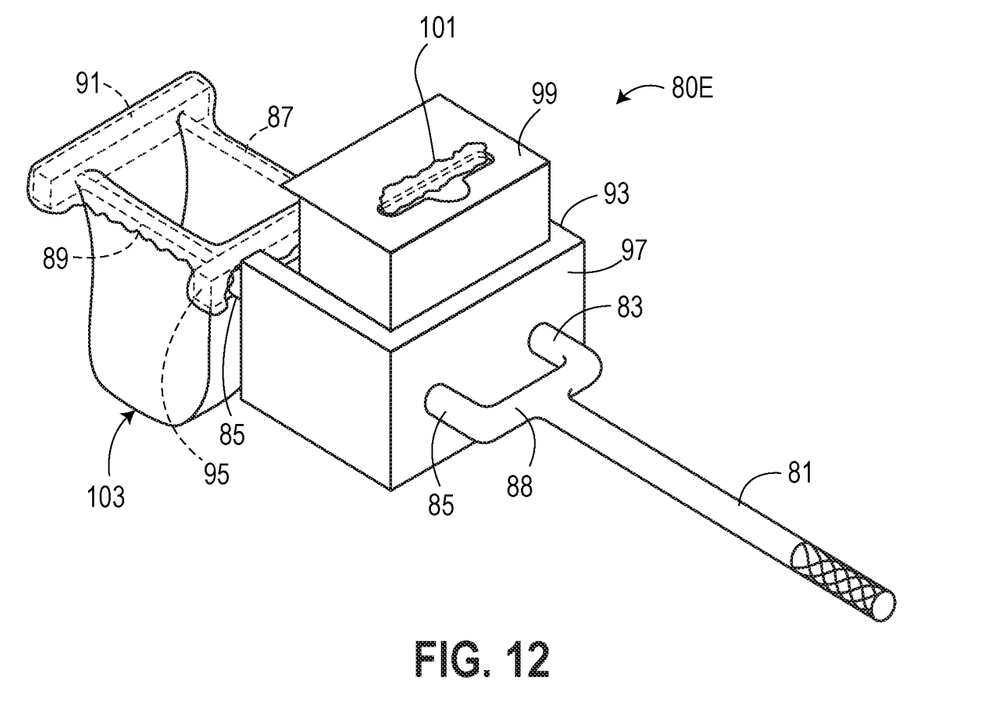

FIG. 8 shows a partially cut top view of another version of the present invention pet waste collection device that is similar to the foregoing, except that a sliding handle creates a telescoping effect. Thus, here, instead of a telescoping pole, as previously described, the handle is a slidable handle that has movement to open and collapse-store the collapsible support frame. FIGS. 9, 10 and 11 show partial cut top views of the FIG. 8 present invention pet waste collection device embodiment but with the collapsible support frame being more and more extended toward fully open. FIG. 12 shows an oblique side view of the present invention pet waste collection device shown in FIG. 8, but fully opened and ready for use. All of these FIGS. 8 through 12 are now discussed collectively, with each numbered component appearing in at least one of these Figures, and wherein identical parts in each of these Figures are identically numbered.

This present invention pet waste collection device uses the numeral 80 with sequential letters to designate different positionings (extension) of the pooper bag frame. In FIG. 8, the device is device 80A, in FIG. 9 it is 80B, etc. Thus, it is generally referred to here as the device. The device has a handle 81 that has stops, but moves further into and partially out of main housing 93. This main housing 93 has a hollow inside area and has a top, a bottom, a front wall, a back wall 97 and at least one sidewall, and has an opening accessible to the hollow inside area at or near its front wall (shown as open). The main housing 93 further including a recessed wall area adapted for nesting of a collapsible frame, and at least one orifice on the back wall for movement of a portion of a sliding pole, which is handle 81. Here, there are two orifices on back wall 97.

The sliding handle 81 has a proximal end positioned backwardly away from the two orifices of back wall 97 and a distal end positioned forwardly away from and on the other side of the two orifices such that the sliding pole rests within and passes through the two orifices. In these Figures, handle 81 has a mid-section that yokes into two parallel, thick segments 83 and 85. Sections 83 and 85 terminate to smaller diameter or cross-section segments 87 and 89. Larger segments 83 and 85 are moveable within the two orifices 84 and 86 (FIG. 8), but stop at the top of the yoke 88 when pushed as forward as possible. Smaller segments 87 and 89 are slideably positioned in orifices of receptacle frame back wall 95 and the far ends of smaller segments 87 and 89 are fixedly attached to frame front wall 91. As can be seen at device 80A, this is a fully contracted position wherein the distal end of the pole (segments 87 and 89 and front wall 91) is contracted into hollow inside area of main housing 93 and the collapsible frame is collapsed and located inside of and nested in the hollow inside area, as well. FIG. 9 shows that segments 87 and 89 of device 80B have been pushed forward so that front wall 91 is partially extended but back wall 95 has not yet moved; FIG. 10 shows device 80C with the back wall 95 engaged and moving by the forward motion of the now-touching segments 83 and 85; FIG. 11 shows device 80D with segments 87 and 89, front wall 91 and back wall 95 in the form of a rectangle to support a pooper bag, and with the handle 81 pushed significantly forward. FIG. 12 shows device 80E with all components fully extended and supporting bag 103 for use.

In these embodiments, it can be seen that the sliding pole distal end being connected to a section of a slidable, collapsible frame for extension and contraction thereof, and having an extended position wherein the pole distal end and the collapsible frame are located outside of the hollow inside area and the collapsible frame is open and extended. Also, in these embodiments, the collapsible frame for a holding a waste receptacle (pooper bag), is formed of at least two unconnected frame sections, and movably related to movement of the pole, at least a first frame section being a frame section connected to the pole distal end for movement therewith, and at least a second frame section that is positioned to be pushed by the movement of the pole and to be pulled by opposite movement of the pole with the first frame section, wherein the at least two unconnected frame sections has a first position and a second position, wherein the first position is a collapsed position, being a retracted, closed position within the main housing hollow inside area, and the second position is an extended, open position outside of the main housing hollow inside area, and further wherein one frame section of the at least two unconnected frame sections is a leading linear frame section for positioning closest to the rear of a pet to create a wide linear edge area for efficient pet waste collection.

Although particular embodiments of the invention have been described in detail herein with reference to the accompanying drawings, it is to be understood that the invention is not limited to those particular embodiments, and that various changes and modifications may be made therein by one skilled in the art without departing from the scope or spirit of the invention as defined in the appended claims. For example, the actual shape of the main housing may be any of numerous possibilities as long as its functionality as described is not affected adversely.

What is claimed is:

1. A pet waste collection system, which comprises:
   a) a main housing having a hollow inside area and having a top, a bottom, a front, and a back wall and at least one sidewall, and having an opening accessible to said hollow inside area, said main housing further including a recessed wall area adapted for nesting of a collapsible frame, and at least one orifice on said back wall for movement of a portion of a sliding pole;
   b) said sliding pole, having a proximal end positioned backwardly away from said at least one orifice and having a distal end positioned forwardly away from said at least one orifice such that said sliding pole rests within said at least one orifice, said sliding pole distal end being connected to section of a slidable, collapsible frame for extension and contraction thereof, and having an extended position wherein said pole distal end and said collapsible frame are located outside of said hollow inside area and said collapsible frame is open and extended, and having a contracted position wherein said distal end of said pole is contracted into said hollow inside area and said collapsible frame is collapsed and located inside of and nested in said hollow inside area;
   c) said collapsible frame for holding a waste receptacle, which is formed of at least two unconnected frame sections, and movably related to movement of said pole, at least a first frame section being a frame section connected to said pole distal end for movement therewith, and at least a second frame section that is positioned to be pushed by said movement of said pole and to be pulled by opposite movement of said pole with said first frame section, wherein said at least two unconnected frame sections has a first position and a second position, wherein said first position is a collapsed position, being a retracted, closed position within said main housing hollow inside area, and said second position is an extended, open position outside of said main housing hollow inside area, and further wherein one frame section of said at least two unconnected frame sections is a leading linear frame section for positioning closest to the rear of a pet to create a wide linear edge area for efficient pet waste collection.

2. The pet waste collection system of claim 1 wherein all of said frame sections are linear and when in said open position are in the shape of a rectangle from a top view.

3. The pet waste collection system of claim 2 wherein there are at least four linear frame sections, including one leading frame section, one trailing frame section, at least one left frame section and at least one right frame section, said leading frame section and said trailing frame section being parallel to one another.

4. The pet waste collection system of claim 3 wherein said slidable pole has a two pronged distal end connected to said at least one frame section and said back wall has two corresponding orifices, each of which hold one said two prongs.

5. The pet waste collection system of claim 3 wherein there is a rear frame section and a front frame section, wherein said rear frame section has at least one passageway for said pole and said at least one passageway has a smaller size than said at least one orifice and said pole has two sections, a rear section and a front section, and the cross-section size of the front section is less than the cross-section size of the rear section.

6. The pet waste collection system of claim 3 wherein said main housing is made of a plastic material.

7. The pet waste collection system of claim 3 wherein all of said frame sections are made of plastic material.

8. The pet waste collection system of claim 1 wherein said main housing includes a waste receptacle storage area for storing a plurality of unused waste receptacles.

9. The pet waste collection system of claim 8 wherein said main housing includes a waste receptacle storage area which is located in a position on said main housing which is below said recessed wall area.

10. The pet waste collection system of claim 9 wherein said storage area is an enclosed area with open and close access.

11. A pet waste collection system, which comprises:
    a) a main housing having a hollow area inside and having a top, a bottom, a front, and a back and two sidewalls, and having an opening accessible to said hollow inside area located at said front;
    b) a handle connected to and extending backwardly from said main housing;
    c) a telescopically extendable and contractible pole located within said main housing, and having a distal end connected to an articulated, foldable rectangular frame;
    d) said rectangular frame for receiving and holding a waste collection bag, having a rear frame section, at least two left side frame sections, at least two right side frame sections, and a front frame section, wherein said rear frame section is connected to said pole and said front frame section is hingedly connected to said rear frame section via one of said left side frame sections and one of said right side sections, and wherein said rectangular frame has a first, closed position wherein said front frame section is folded over to said rear frame section, and has an open position wherein said front frame section is unfolded and away from said rear frame section, and further wherein said front frame section includes a linear frame portion for positioning closest to the rear of a pet to create a wide linear edge area for efficient pet waste collection;
    e) said main housing having a hinged front door connected thereto.

12. The pet waste collection system of claim 11 wherein there are two left side frame sections and two right side frame sections.

13. The pet waste collection system of claim 12 wherein all of said two left side frame sections and said two right side frame sections are the same length.

14. The pet waste collection system of claim 11 wherein when said rectangular frame is in its first, closed position, said pole is retracted and said rectangular frame is positioned in said main housing.

15. The pet waste collection system of claim 11 wherein said main housing has a hinged front door connected thereto at the bottom of said main housing to permit said hinged door to open downwardly.

16. The pet waste collection system of claim 11 wherein said main housing includes a waste receptacle storage area for storing a plurality of unused waste receptacles.

17. The pet waste collection system of claim 16 wherein said main housing includes a waste receptacle storage area connected to said main housing.

18. The pet waste collection system of claim 16 wherein said waste receptacle storage area is an enclosed area with open and close access.

19. The pet waste collection system of claim 11 wherein said main housing and all of said frame sections are made of a plastic material.

\* \* \* \* \*